United States Patent Office 2,918,933
Patented Dec. 29, 1959

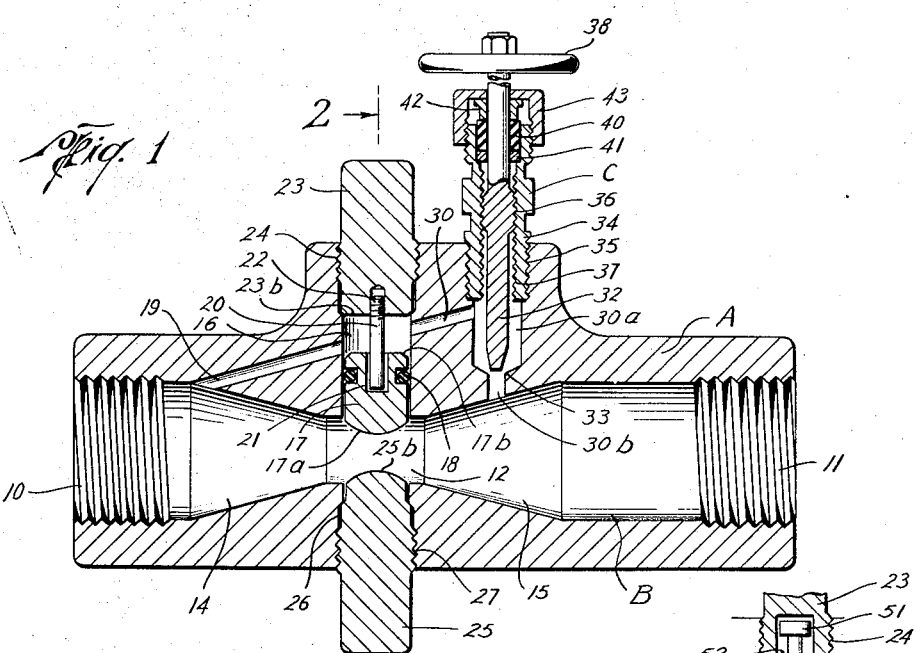
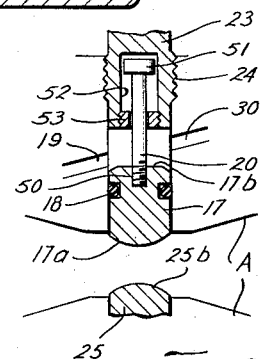
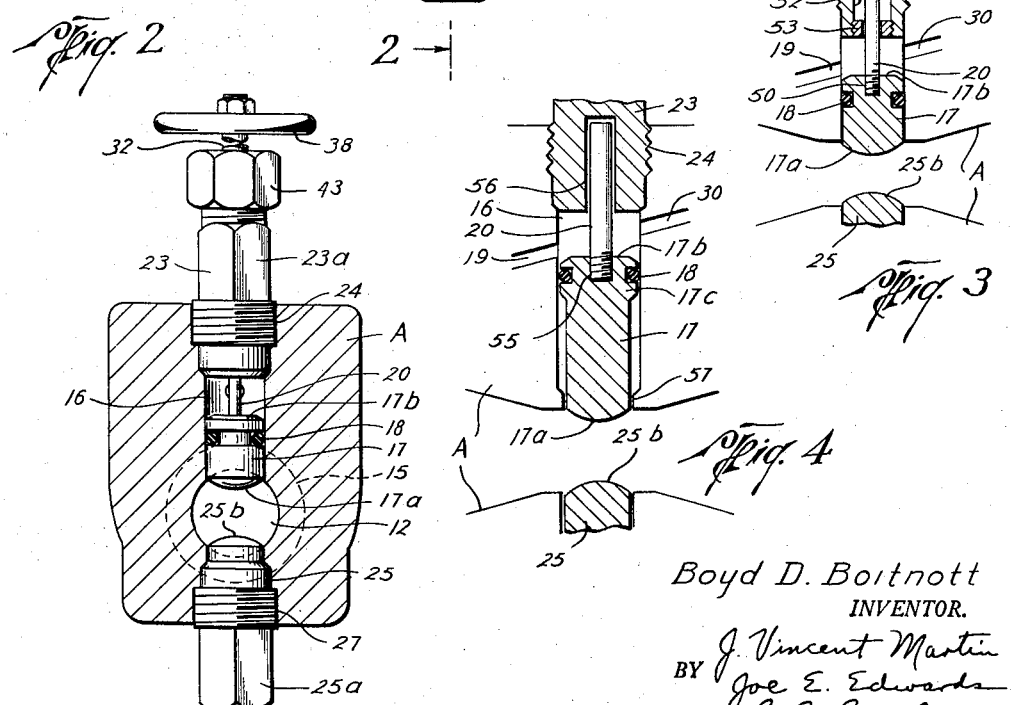

2,918,933

CONSTANT VOLUME CONTROLS

Boyd D. Boitnott, Houston, Tex., assignor to Oil Center Tool Company, Houston, Tex., a corporation of Texas Application November 14, 1952, Serial No. 320,574

6 Claims. (Cl. 137—502)

This invention relates to new and useful improvements in constant volume controls.

An object of this invention is to provide a constant volume control which automatically maintains constant the volume of fluid flowing therethrough.

An important object of this invention is to provide a constant volume control adapted to be connected in a pipe, which control provides for an automatic compensation for changes in the volume flowing to the control whereby a constant volume is discharged therefrom.

Another object of this invention is to provide a constant volume control including a body having a passage therein through which fluid may flow, and a piston slidable in said body and adapted to change the size of the passage in accordance with changes in the pressure of the fluid flowing through said passage.

Another object of this invention is to provide a constant volume control for automatically maintaining constant the volume of fluid flowing therethrough, wherein the control includes a venturi through which the fluid flows, the throat of the venturi being changed in the amount of its opening by a piston slidably arranged to move in and out of the venturi at its throat in accordance with the changes in the volume on the upstream side of the throat, whereby the piston regulates the amount of volume discharged to the downstream side of the throat so that a constant volume is discharged therefrom.

The construction designed to carry out the invention will be hereinafter described, together with other features thereof.

The invention will be more readily understood from a reading of the following specification and by reference to the accompanying drawings forming a part thereof, wherein an example of the invention is shown, and wherein:

Figure 1 is a vertical sectional view of the constant volume control of this invention.

Figure 2 is a vertical sectional view taken on line 2—2 of Figure 1.

Figure 3 is a partial view of the control, illustrating a modified construction of the piston or reciprocating member, with its stinger rod.

Figure 4 is a view similar to Figure 3, illustrating another modification of the piston and stinger rod construction.

In the drawings, the letter A designates the body of the constant volume control of this invention, such body being tubular and having a longitudinal passage B extending therethrough. The passage B has at one thereof internal threads 10 for connection with a threaded pipe (not shown) and at the other end thereof, internal threads 11 for connection with another pipe, whereby the control of this invention may be disposed in a pipe line for automatically controlling the volume of fluid flowing through the pipe line.

As can be seen in Figure 1, the passage B has a restricted portion or reduced diameter section 12 with a tapered or frusto-conical portion 14 on the upstream side of the restricted portion 12. The tapered portion is inclined inwardly toward the restricted portion 12 and merges therewith. On the downstream side of the restricted portion 12 there is disposed a flared or tapered portion 15 which is of the frusto-conical shape as is the tapered or flared portion 14. However, the tapered portion 15 is flared or inclined outwardly from the restricted portion 12. Thus, as a fluid enters the upstream side of the passage B it is gradually forced into the smaller diameter portion 12 of the passage B by the tapered section 14, and then is discharged from the restricted portion 12 and the force or confinement is reduced gradually as the flowing of the tapered portion 15 increases to the size of the pipe connected to the passage B.

It will be appreciated that the tapered portion 14, restricted portion 12, and the tapered portion 15 of the passage B form a venturi, with the restricted portion 12 being the throat of the venturi. The flow characteristics of a fluid through the passage B will therefore assume those existing in a venturi.

Disposed above the throat or restricted portion 12 is a chamber 16 which has an open lower end communicating with the throat 12. This chamber 16 has a reciprocating member or piston 17 mounted therein for reciprocation at an angle normal or perpendicular to the axis of the throat 12.

The piston 17 preferably has a seal ring 18 disposed in an annular recess in the periphery of the piston 17, with the seal ring 18 contacting the walls of the chamber 16 so as to prevent fluid passing through the passage B from passing between the piston 17 and the walls of the chamber 16. This, therefore, directs the force of the fluid passing through the passage B against the curved face or lower end 17a of the piston 17.

The body A has a flow line 19 which communicates with the upstream side of the venturi throat 12 and the upper end of the chamber 16, whereby the force of the fluid pressure entering the passage B is disposed on the upper end 17b of the piston 17.

In the form of the invention shown in Figure 1, the upward movement of the piston 17 is limited by a stinger rod 20 which serves as a stop for such upward movement of the piston 17 by reason of its contact with the lower end of a slot 21 in the piston 17. The rod 20 is supported in the body A by a threaded connection 22 with a plug 23 which is threaded into the body A with threads 24. The plug 23 has flat sides 23a extending above the body A so that a wrench may be applied to remove the plug 23 from the body A, leaving an open bore above the piston 17 for the removal thereof from the body A. When the plug 23 is in the position shown in Figure 1, its lower end 23b defines the upper end of the chamber 16 and that, of course, is the normal position of the plug 23 when the control is in use.

For cleaning and assembly purposes, an insert 25 is disposed in an opening 26 in the body A. Such opening 26 is aligned axially with the chamber 16 and is of substantially the same diameter so that upon removal of the insert 25 the piston 17 may be removed therethrough if desired. The insert 25 is held in position in the opening 26 by a threaded connection 27, and the threading of the insert 25 may be enhanced by the flat sections 25a on the lower end of the insert 25 extending below the body A, which flat sections 25a are adapted to receive a wrench. The upper end of the insert 25 is designated 25b and is curved or arcuate in the same manner as the lower end 17a of the piston 17. This provides for a single point contact of the surface 17a with the surface 25b in the event that the piston 17 falls downwardly when the control is not in use. By reason of such single point contact, it is possible for fluid to force the piston 17 upwardly upon the initial flow therethrough due to the fact that the majority of the area of the piston 17 at its lower end 17a is exposed to the pressure of the fluid flowing.

To obtain static conditions of fluid flow through the passage B, that is, to obtain a desired volume of discharge from the throat 12 to the downstream 5 thereof, a by-pass valve C has been disposed in the body A. The body A has a by-pass line 30 which extends from, and establishes communication between, the upper end of the chamber 16 above the upper end 17b of the piston and the flared downstream portion 15 of the passage B. As shown in the drawings, this by-pass line 30 includes an enlarged diameter portion 30a and an outlet 30b to the flared or tapered portion of passage B. The valve stem 32 of the valve C extends into the enlarged portion 30a of the by-pass line 30 and seats on a valve seat 33 at the lower end of the enlarged portion 30a to close the by-pass line 30. The by-pass valve C may be constructed in various ways, but as shown in the drawing, the stem 32 is threaded into a housing 34 which is threaded into the body A at 35. The threads 36 on the stem co-act with threads 37 on the bore of the housing 34, whereby rotation of the stem 32 by the handle 38 or other suitable means effects the upward or downward movement of the stem 32 with respect to the valve seat 33. Suitable packing or sealing members may be provided for the valve stem and, as shown in Figure 1, such sealing elements include an annular elastic ring 40 supported on a metallic ring 41, with a packing gland nut 42 disposed thereabove, such gland nut 42 being forced downwardly to compress the seal member 40 by a threaded cap 43.

In the operation of the control of this invention, with the parts in the position shown in Figure 1, the maximum volume of fluid can pass through the passage B. It will be observed that the piston 17 is in its extreme upper position with the bottom of the slot 21 in contact with the stop pin 20, and the by-pass valve C is open. With the by-pass valve open, the fluid flow through the flow line 19 will be entirely by-passed through the by-pass line 30 so that there is substantially no pressure of the fluid acting on the upper end 17b of the piston 17. Thus, the pressure of the fluid flowing through the passage B must only be sufficient to overcome the weight of the piston 17. When it is desired to reduce the volume which is discharged from the throat 12 into the flared portion 15 of passage B the stem 32 can be rotated to move downwardly to partially close the by-pass line 30 by restricting the flow through the outlet portion 30b of such by-pass line 30. By restricting the amount of by-pass through the by-pass line 30, the pressure of the fluid from the upstream side of the throat 12 will act on the upper end of the piston 17 to urge it downwardly. Thus, it can be seen that as the valve C is closed by lowering the stem 32 into full contact with the valve seat 33, the maximum of pressure can be obtained in the chamber 16 above the upper end 17b of the piston 17 so that a minimum flow will be obtained. Ordinarily, the valve will be constructed and the stem 32 will be so positioned, that the piston 17 will assume an intermediate position between its maximum flow and its minimum flow.

Once the predetermined volume discharge from the throat 12 is obtained, the volume is thereafter maintained constant, even though the volume from the upstream side of the throat 12 fluctuates. For example, assuming that a fluid, which may be either a gas or a liquid, is flowing through the passage B and the piston 17 is in an intermediate position between maximum flow, wherein the piston 17 would be abutting the pin 20, and minimum flow, wherein the lower end 17a is in contact with the upper end 25b of the insert 25, with the piston 17 in such an intermediate position, the valve C would generally also be in an intermediate position with the by-pass line 30 partially open.

With the piston 17 in its intermediate position, should the volume of fluid flowing through the passage B increase on the upstream side of the throat 12, there will be an increase in pressure on the upper end of the piston 17b and an increase in pressure on the lower end 17a of the piston 17. However, due to the flow characteristics of the fluid through the venturi construction, the pressure above the piston 17 which enters into the chamber 16 through the flow line 19 will be slightly greater than the pressure on the lower end 17a, whereby the piston 17 will be moved downwardly in accordance with the differential in pressure increase on the piston 17 until the size of the throat opening is reduced so that the pressure in that area is increased to balance the increase in pressure above the piston 17. When the balance occurs, the piston 17 will remain in its position. Thus, the increase in the volume on the upstream side of the passage B causes the piston 17 to move downwardly to further restrict the size of the opening in the throat 12, which results in restricting the amount of fluid which can pass therethrough. Therefore, even though the velocity of the fluid flowing through the passage B is increased due to the increased volume, the actual volume delivered at the downstream side of the passage B remains constant due to the reduction in the size of the throat 12.

In the form of the invention shown in Figure 3, the only portion of the device which has been modified is the stinger rod construction with the piston 17. As shown in Figure 3, the stinger rod 20 is threaded at 50 into the upper end of the piston 17. The upper end of the rod 20 has an annular flange or head 51 which is disposed within a slot 52 in the plug 23. A retaining ring 53 is threaded into the lower end of the slot 52 to limit the downward movement of the head 51 and consequently to limit the downward movement of the piston 17. The upper end of the slot 52, of course, limits the upward movement of the piston 17 so that the piston 17 at no time closes the flow line 19 and the by-pass line 30. Although the head 51 is a sufficient distance from the stop ring 53 to prevent their contact before the lower end 17a contacts the upper end 25b of the insert 25, in some instances the head 51 may prevent the piston 17 from falling out of the passage 26 in which the insert 25 is mounted. This may occur when the insert 25 has been removed for cleaning purposes and it is not desired to remove the piston 17. The operation of the piston 17 is exactly the same as the form illustrated in Figure 1.

Figure 4 illustrates still another modification of the stinger rod 20 and the piston 17 construction. In this form, the rod 20 is threaded at 55 into the upper end of the piston 17 and such rod 20 extends upwardly from the piston 17 into a slot 56 in the plug 23, whereby contact of the upper end of the rod 20 with the upper end of the slot 56 limits the upward movement of the piston 17. In the form of the invention shown in Figure 4, the piston 17 has an enlarged diameter portion 17c in which the annular seal ring 18 is disposed for contact with the walls of the chamber 16. An annular shoulder 57 is provided on the lower end of the chamber 16 to serve as a stop for the downward movement of the piston 17 upon contact of the enlarged shoulder 17c with the annular shoulder or stop 57. The operation of the structure shown in Figure 4 is the same as the form shown in Figure 1. It will be observed, of course, that in the forms shown in Figures 3 and 4 there is a downward stop which is not present in the form shown in Figure 1.

The foregoing disclosure and description of the invention is illustrative and explanatory thereof and various changes in the size, shape and materials as well as in the details of the illustrated construction, may be made, within the scope of the appended claims, without departing from the spirit of the invention.

What is claimed is:

1. A volume control device including a tubular body having a longitudinal passage therethrough for the flow of fluids, said passage having a restricted portion and a flared portion on the upstream side of said restricted portion and communicating therewith providing a venturi, said body having a chamber therein communicating with said restricted portion, a piston slidably mounted in said chamber with one end exposed to the fluid in said restricted portion, and said body also having a flow line therein connecting said flared portion and the passage downstream of said restriction portion to said chamber above the other end of said piston and a restriction in said flow line between the chamber and passage downstream of said restricted position, whereby changes in the volume of fluid entering the passage will automatically move the piston to change the size of the passage at the restricted portion thereof so as to maintain a constant volume discharging downstream from said restricted portion.

2. The device as set forth in claim 1, including a stinger rod supported from said body above said piston, said piston having a slot in its upper end for receiving said rod whereby said piston is limited in its upward movement.

3. The device set forth in claim 1, including a stinger rod connected to the upper end of said piston, and said body having a slot above said chamber into which said rod extends to limit the upward movement of said piston.

4. The device set forth in claim 3, including an enlarged diameter portion on said piston, and a shoulder extending from the walls of said chamber to limit the downward movement of said piston.

5. The device set forth in claim 3, including means on said stinger rod for limiting the downward movement of said piston.

6. A constant volume control for automatically maintaining constant the volume of fluid flowing therethrough, including a tubular body having a passage extending longitudinally therethrough with a venturi formed in the passage, a piston slidably mounted in the body for movement into and out of the throat of the venturi to change the amount of opening of said throat, said body having a flow line formed therein communicating with the upstream side of said venturi and the end of said piston remote from said throat whereby the pressure in said throat acts on one end of said piston and the pressure from the upstream side of said venturi acts on the other end thereof, said body having a by-pass line communicating with the end of the piston remote from said throat and the downstream side of said venturi, and a valve in said by-pass line to regulate the desired volume of fluid flowing through said venturi.

References Cited in the file of this patent

UNITED STATES PATENTS

| | | |
|---|---|---|
| 33,873 | Abbott | Dec. 10, 1861 |
| 483,979 | Foster | Oct. 4, 1892 |
| 842,393 | Ferranti | Jan. 29, 1907 |
| 930,158 | Connet | Aug. 3, 1909 |
| 1,467,522 | Amsler | Sept. 11, 1923 |
| 1,934,759 | Adelson | Nov. 14, 1933 |
| 2,146,537 | Farnhan | Feb. 7, 1939 |
| 2,192,042 | Hoffman | Feb. 27, 1940 |
| 2,340,954 | Garretson | Feb. 8, 1944 |
| 2,577,391 | Williams | Dec. 4, 1951 |
| 2,629,578 | Paul | Feb. 24, 1953 |
| 2,701,704 | Lawrence | Feb. 8, 1955 |

FOREIGN PATENTS

| | | |
|---|---|---|
| 326,647 | Italy | June 10, 1935 |